(12) United States Patent
Schultz (10) Patent No.: US 7,268,969 B2
(45) Date of Patent: Sep. 11, 2007

(54) REPEATABLE TIMING MARK POSITION ERROR CORRECTION IN SELF-SERVOWRITE

(75) Inventor: Mark Delorman Schultz, Ossining, NY (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 455 days.

(21) Appl. No.: 10/880,850

(22) Filed: Jun. 30, 2004

(65) Prior Publication Data
US 2006/0002000 A1    Jan. 5, 2006

(51) Int. Cl.
*G11B 5/596* (2006.01)
(52) U.S. Cl. .................. 360/77.04; 360/77.08; 360/78.04
(58) Field of Classification Search .............. None
See application file for complete search history.

(56) References Cited

U.S. PATENT DOCUMENTS

| | | | |
|---|---|---|---|
| 6,411,453 B1 | 6/2002 | Chainer et al. | |
| 6,657,810 B1* | 12/2003 | Kupferman | 360/77.04 |
| 6,937,420 B1* | 8/2005 | McNab et al. | 360/75 |
| 2002/0039248 A1* | 4/2002 | Liu et al. | 360/77.04 |
| 2002/0085299 A1 | 7/2002 | Chainer et al. | |

* cited by examiner

*Primary Examiner*—William Korzuch
*Assistant Examiner*—Daniell L. Negrón
(74) *Attorney, Agent, or Firm*—Patrick Duncan; Steven J. Cahill; Joseph P. Curtin (57) ABSTRACT

The periodic component of a timing mark position error of a self-servo write pattern on a disk of a disk drive is determined based on measurements that are made of the timing mark position error at selected radial track locations. The determined periodic component of the timing mark position error is then removed based on the radial location on the disk.

28 Claims, 5 Drawing Sheets

REPEATABLE TIMING MARK POSITION ERROR CORRECTION IN SELF-SERVOWRITE

BACKGROUND OF THE INVENTION

1. Field of the Invention

The present invention relates to disk drives. More particularly, the present invention relates to a system and a method for removing the periodic component of the timing mark position error of a self-servo write pattern.

2. Description of the Related Art

Figure 1:
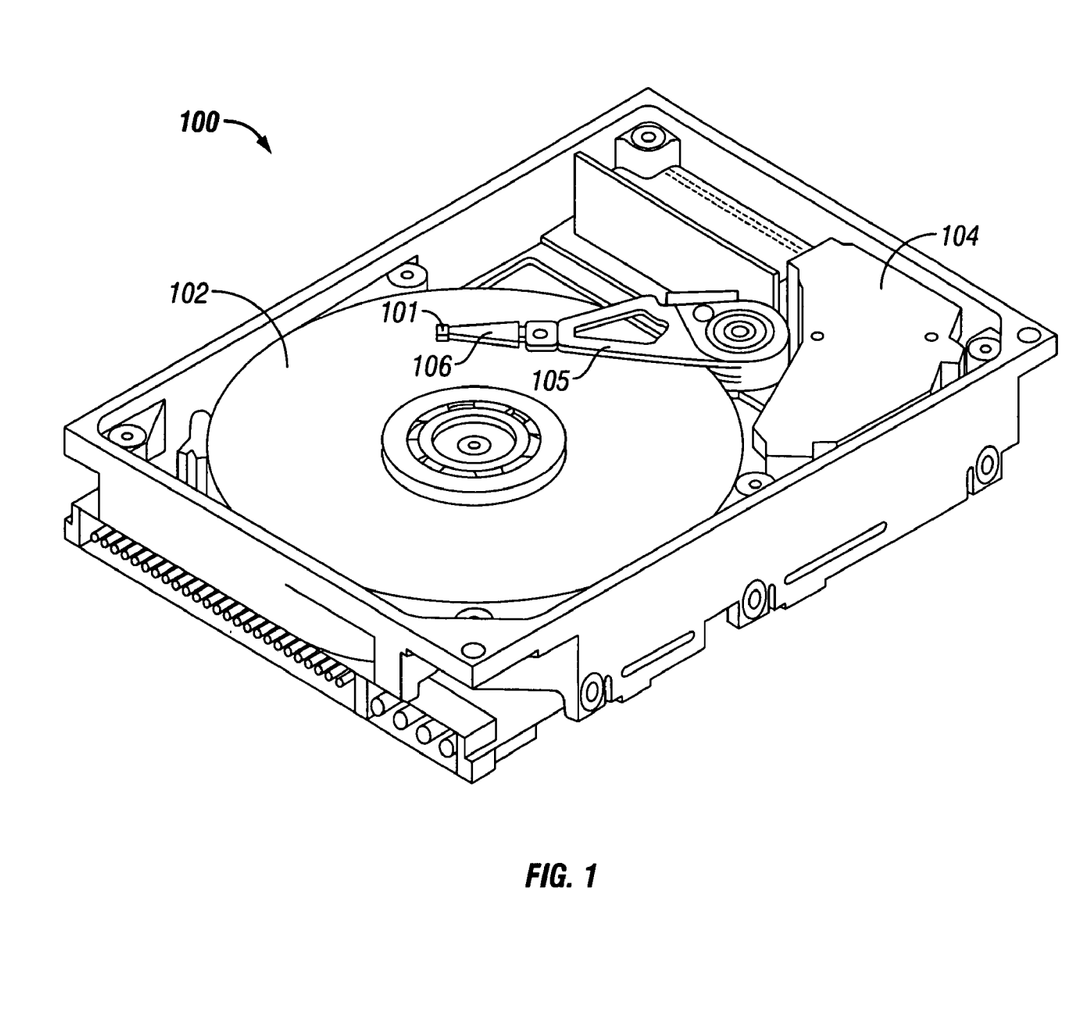
FIG. 1 shows an exemplary hard disk drive (HDD) having a dual-stage servo system.

FIG. 1 shows an exemplary hard disk drive (HDD) 100 having a recording slider that includes, for example, an offset head 101, that is positioned over a selected track on a magnetic disk 102 using a servo system for writing data to and/or reading data from disk 102. Data is recorded in arrays of concentric data information tracks on the surface of disk 102. While HDD 100 shows only a single magnetic disk 102, HDDs typically have a plurality of stacked, commonly rotated rigid magnetic disks. The servo system of HDD 100 can include an actuator 105, a voice-coil motor (VCM) 104, for coarse positioning a read/write head suspension 106, and a secondary actuator, such as a microactuator or micropositioner, for fine positioning read/write head 101 over a selected track. As used herein, a microactuator (or a micropositioner) is a small actuator that is placed between a suspension and a slider and moves the slider relative to the suspension.

Conventional self-servo writing is basically performed one track at a time from the inner diameter (ID) to the outer diameter (OD) of a magnetic recording disk, such as disk 102, using a spindle motor index and information from previously written nearby tracks. The magneto-resistive (MR) read sensor and the write element are offset from each other on offset head 101 and, consequently, are not on same radius, particularly toward OD of the disk. Accordingly, the offset between the read sensor and the write element changes with respect to tracks on the disk as the skew angle of the armature changes. For example, near the ID of the disk, the offset between the read sensor and the write element typically is a distance of about eight tracks. At the OD of the disk, the offset between the read sensor and the write element typically is a distance of about 40 tracks. The offset difference with respect to the disk is further exacerbated by variations in the read/write head dimensions and track densities between different models of disk drives and the variations between "identical" parts for the same model of disk drives.

Ideally, a self-servo pattern should be a line nominally following the arc of motion of the head from the ID to the OD of the disk, but because self-servo writing is basically performed by writing the servo pattern one track at a time and because of the offset between the read sensor and the write element, errors propagate through the servo pattern that cause the servo pattern to be warped away from the desired trajectory (which is nominally straight locally). One error pattern that propagates through the self-servo pattern from the ID to the OD of a disk has a period that is related to the offset distance between the read sensor and the write element. To further complicate matters, the periodic error pattern changes as the skew angle of the armature changes. Thus, the warp can become large enough to cause a low-amplitude misalignment or missed windows during a high-speed seek.

Consequently, what is needed is a technique to determine and remove the periodic component of the timing mark position error of a self-servo write pattern.

BRIEF SUMMARY OF THE INVENTION

The present invention provides a technique to determine and remove the periodic component of the timing mark position error of a self-servo write pattern.

The advantages of the present invention are provided by a method for measuring a periodic component of a timing mark position error of a self-servo write pattern of a disk drive. According to one exemplary embodiment of the present invention, the timing mark position error of a first selected radial track location of a disk of the disk drive is measured. Next, the timing mark position error of a second selected radial track location of the disk is measured. The periodic component of the timing mark position error of the self-servo write pattern is determined based on the timing mark position error of the first selected radial track location and the timing mark position error of the second selected radial track location. The period of the periodic component of the timing mark position error is based on the offset between the read sensor and the write element of the read/write head, and the maximum value of the periodic component of the timing mark position error is based on half of the offset between the read sensor and the write element of the read/write head.

In another exemplary embodiment of the present invention, the distance between the first selected radial track location and the second selected radial track location is based on an offset between a read sensor and a write element of a read/write head of the disk drive. In yet another exemplary embodiment of the present invention, the distance between the first selected radial track location and the second selected radial track location is based on half of the offset between the read sensor and the write element of the read/write head.

In still another exemplary embodiment of the present invention, the timing mark position error is measured at a first plurality of selected radial track locations. The timing mark position error is measured at a second plurality of selected radial track location. The periodic component of the timing mark position error of the self-servo write pattern is then determined based on a difference between an average of the timing mark position error of the first plurality of selected radial track locations and an average of the timing mark position error of the second plurality of selected radial track locations.

A further exemplary embodiment of the present invention measures the timing mark position error at a first plurality of selected radial track locations, such that each radial track location of the first plurality of selected radial track locations is related by an offset between a read sensor and a write element of the a read/write head of the disk drive. The timing mark position error is measured at a second plurality of selected radial track locations, such that each radial track location of the second plurality of selected radial track locations being related by the offset between a read sensor and a write element of the a read/write head of the disk drive. The periodic component of the timing mark position error of the self-servo write pattern is then determined based on an average of the timing mark position error of the first plurality of selected radial track locations and an average of the timing mark position error of the second plurality of selected radial track locations. An even further exemplary embodiment provides that the timing mark position error is measured at at least one additional plurality of selected radial track location, such that each radial track location of each additional plurality of selected radial track locations is related by on an offset between a read sensor and a write element of the a read/write head of the disk drive The periodic component of the timing mark position error of the self-servo write pattern is determined further based on an average of the timing mark position error of each additional plurality of selected radial track location.

The periodic timing mark position error of the self-servo write pattern is removed based on the determined periodic component of the timing mark position error of the self-servo write pattern. In one exemplary embodiment of the present invention, removing the periodic timing mark position error includes generating a predicted error based on the determined periodic component of the timing mark position error of the self-servo write pattern, and write precompensating a write operation to a selected radial track position between the first selected radial track location and the second selected radial track location based on the generated predicted error corresponding to the radial track position. In another exemplary embodiment of the present invention, removing the periodic timing mark position error includes generating a predicted error based on the determined periodic component of the timing mark position error of the self-servo write pattern, and write precompensating a write operation to a selected radial track position on the disk based on the generated predicted error. The predicted error can have a linear component. Alternatively, the predicted error could be based on a Fourier analysis of the determined the periodic component of the timing mark position error of the self-servo write pattern. In still another exemplary embodiment of the present invention, removing the periodic timing mark position error includes generating a predicted error based on the determined periodic component of the timing mark position error of the self-servo write pattern, and write precompensating a write operation to a selected radial track position on the disk based on the generated predicted error. Yet another exemplary embodiment of the present invention provides that removing the periodic timing mark position error includes generating a predicted error based on the determined periodic component of the timing mark position error of the self-servo write pattern, and write precompensating a write operation to a selected radial track position on the disk based on the generated predicted error.

The present invention also provides a disk drive having at least one recording disk, an armature having a read/write head, such that the read/write head has a read sensor that is offset from a write element, and a controller removing a periodic component of a timing mark position error of a self-servo write pattern of a disk of the disk drive. The controller removes the periodic component of the timing mark position error based on a measurement of a timing mark position error of a first selected radial track location of the disk drive and a measurement of a timing mark position error of a second selected radial track location of the disk drive. The controller can include a memory storing a predicted periodic component of a timing mark position error that is used for removing the periodic component of the timing mark position error. The period of the periodic component of the timing mark position error is based on the offset between the read sensor and the write element of the read/write head, and the maximum value of the periodic component of the timing mark position error is based on half of the offset between the read sensor and the write element of the read/write head.

In one exemplary embodiment of the present invention, the distance between the first selected radial track location and the second selected radial track location is based on an offset between a read sensor and a write element of the read/write head of the disk drive. In another exemplary embodiment, the distance between the first selected radial track location and the second selected radial track location is based on half of the offset between the read sensor and the read sensor and the write sensor of the read/write head.

In one exemplary embodiment, the controller removes the periodic timing mark position error based on a predicted error based on the determined periodic component of the timing mark position error of the self-servo write pattern and by write precompensating a write operation to a radial track position between the first selected radial track location and the second selected radial track location based on the generated predicted error corresponding to the radial track position. The predicted error can include a linear component. Alternatively, the predicted error could be based on a Fourier analysis of the periodic component of the timing mark position error of the self-servo write pattern.

In another exemplary embodiment, the controller removes the periodic timing mark position error by generating a predicted error and by write precompensating a write operation to a selected radial track position on the disk based on the generated predicted error. In still another exemplary embodiment, the controller removes the periodic component of the timing mark position error based on a difference between an average of the timing mark position error of the first plurality of selected radial track locations and an average of the timing mark position error of the second plurality of selected radial track locations. A further exemplary embodiment of the present invention, the controller removes the periodic component of the timing mark position error based on an average of the timing mark position error of the first plurality of selected radial track locations and an average of the timing mark position error of the second plurality of selected radial track locations.

BRIEF DESCRIPTION OF THE DRAWINGS

The present invention is illustrated by way of example and not by limitation in the accompanying figures in which like reference numerals indicate similar elements and in which.

DETAILED DESCRIPTION OF THE INVENTION

The present invention provides a technique to measure the periodic component of the timing mark position error of a self-servo write pattern. Once the periodic component of the timing mark position error has been determined, the periodic position error can be corrected, i.e., removed from the systematic error component over the entire revolution of the disk.

Figure 2:
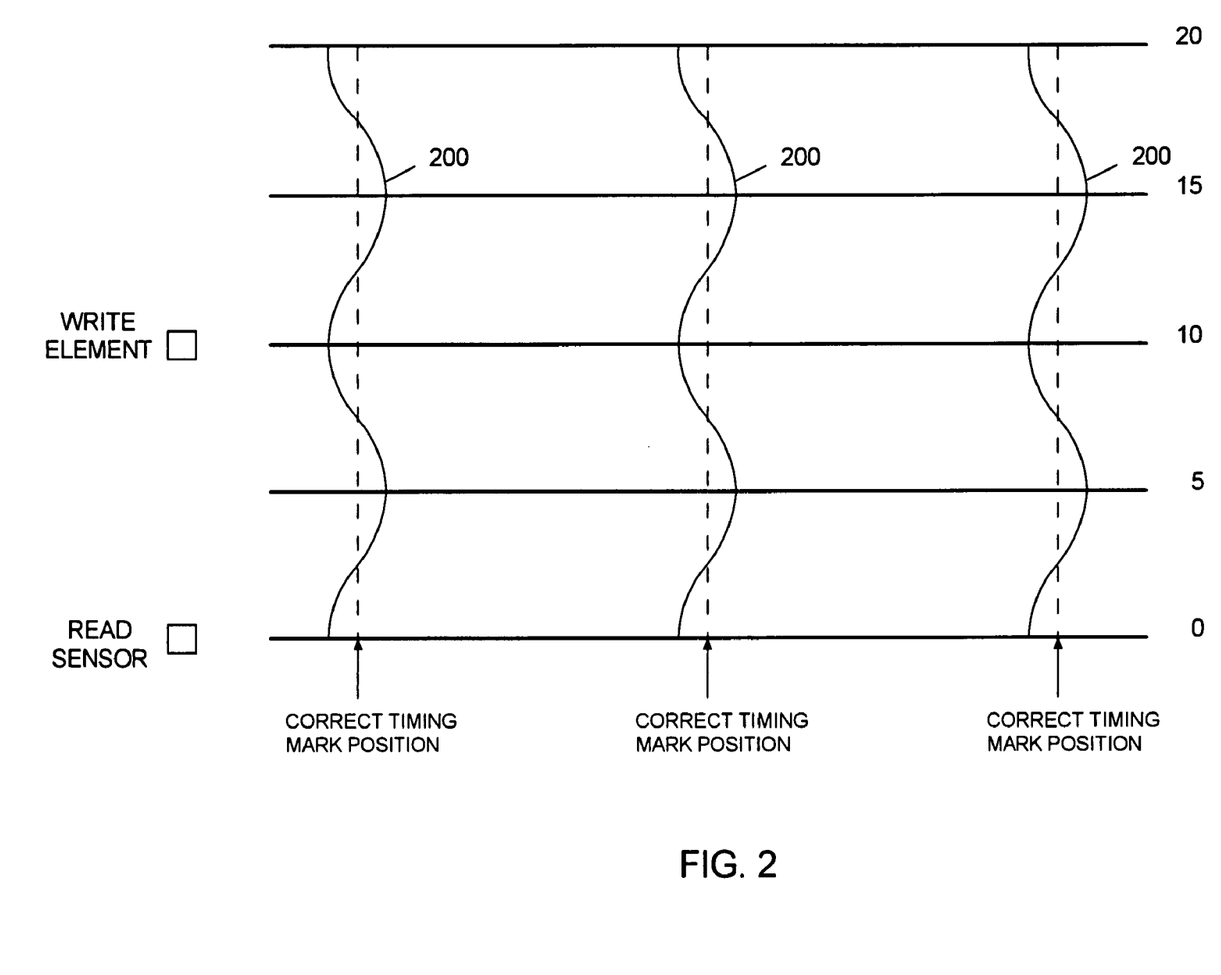
FIG. 2 depicts an exemplary sinusoidal periodic position error pattern with respect to tracks on a portion of a disk and with respect to the correct timing mark position.

The pattern of the periodic position error is sinusoidal and exhibits zero error at one radial location, advances on a track-by-track basis to a maximum error, then returns on a track-by-track base to a zero error at another radial location. For example, FIG. 2 depicts an exemplary sinusoidal periodic position error pattern 200 with respect to tracks on a portion of a disk and with respect to the correct timing mark position. In FIG. 2, the offset between the read sensor and the write element is ten tracks. Periodic position error 200 exhibits zero error at tracks 0 and 10, and exhibits a maximum error at track 5. The periodic nature of the error repeats by exhibiting another maximum error at track 15, a zero error at track 20, a maximum error at track 25, etc. Thus, for a head having a read sensor/write element offset of ten tracks at the disc radius depicted in FIG. 2, track positions 13, 23, 33, 43, etc., are modulo the offset (i.e., 3); track positions 15, 25, 35, 45, etc., are modulo the offset (i.e., 5).

The spindle motor index mark, which is used during a self-servo write, has a 1-σ noise error of about 20 ns. Accordingly, the small track-to-track differences exhibited by the periodic position error pattern cannot be accurately measured on a track-by-track basis. Consequently, the present invention provides two alternative embodiments for determining the periodic position error pattern.

In one exemplary embodiment of the present invention, the position error difference between a predetermined number of tracks, such as ten tracks, is measured and then the average error magnitude and shape of the position error corresponding to each track between the two measurement tracks are predicted. In another exemplary embodiment, the position error measurements are accumulated in bins corresponding to predetermined radial tracks locations. For example, position error measurements are accumulated corresponding to tracks 4, 14, 24, etc. Similarly, position error measurements are accumulated for tracks 5, 15, 25, etc., and for tracks 6, 16, 26, etc. The average position error magnitude is then determined corresponding to each track location. The corresponding shape of the periodic error pattern is also determined based on the accumulated measured position errors for all of the track positions. For both exemplary embodiments of the present invention, the basic measurement that is made to determine the period position error is be the same index-to-first-dibit measurement used in association with a conventional systematic delay loop.

Once the periodic position error has been determined, the periodic position error can be removed from the systematic error component over the entire revolution of the disk by adjusting the write delay associated with a particular track in the same manner as the overall write delay is adjusted to compensate for normal radially varying systematic delays. For example, an array can be created that has a depth that is equal to the read sensor/write element offset and that tracks the index-to-first-dibit error at modulo the offset value. The depth would gradually change as the offset changes. A portion of the periodic position error is used to select an appropriate write delay adjustment to remove the periodic position error based on the position of the read/write head with respect to the tracks of a disk. The gains associated with the correction would be chosen for optimizing control without adding excessive measurement noise.

Figure 3:
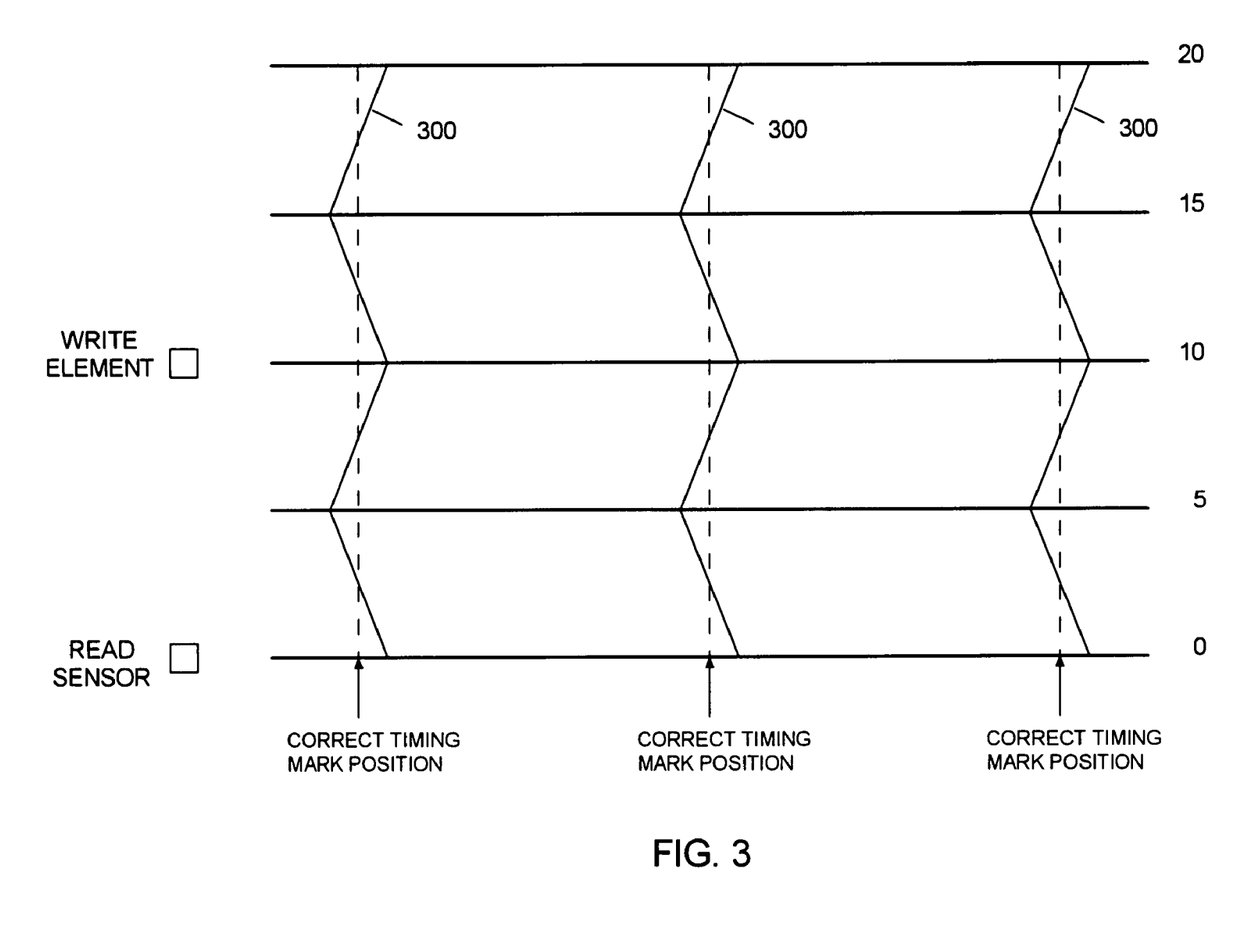
FIG. 3 depicts an exemplary correction pattern according to the present invention with respect to tracks on a portion of the exemplary disk shown in FIG. 2 and with respect to the correct timing mark position.
Figure 4:
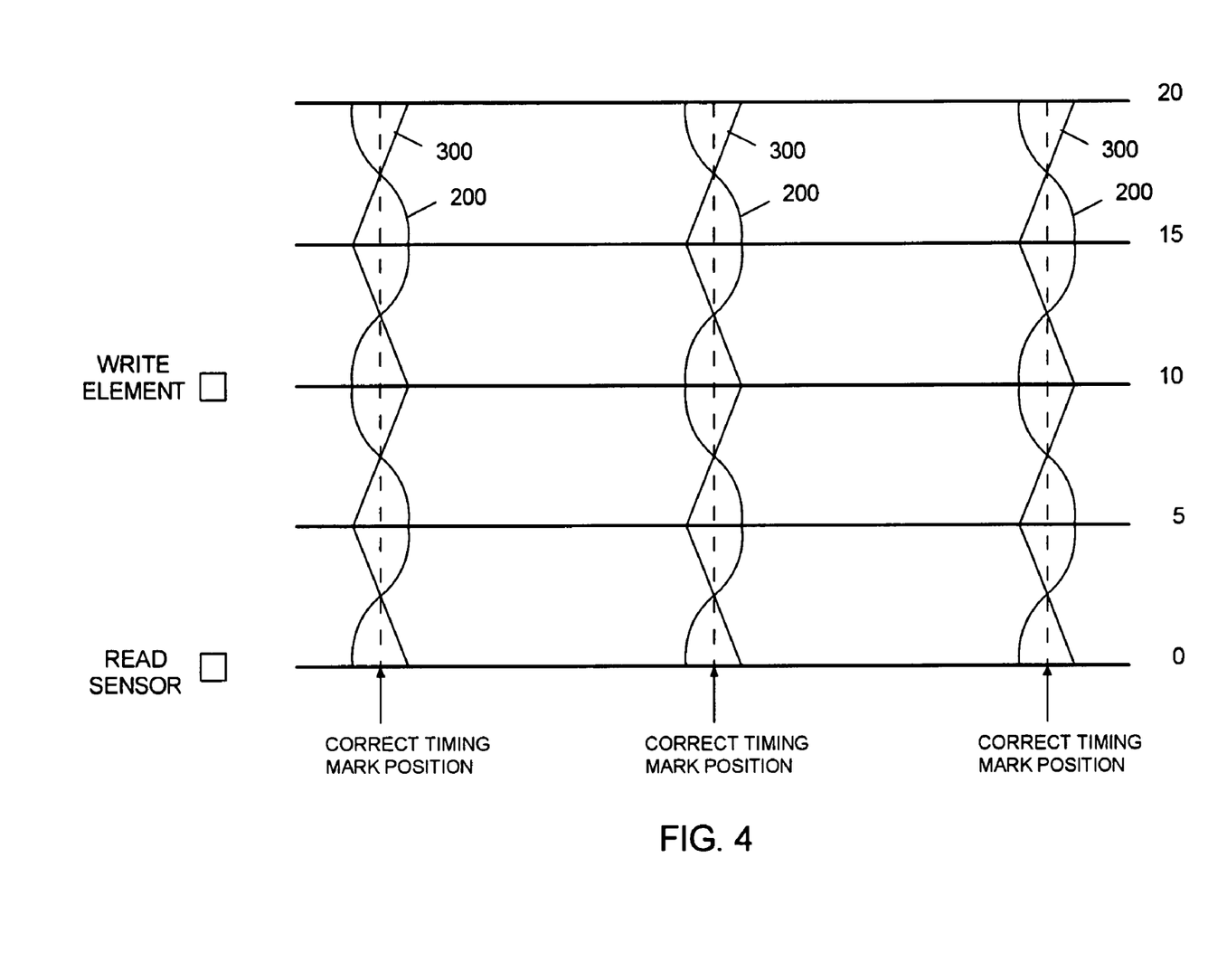
FIG. 4 depicts an exemplary correction pattern according to the present invention with respect to the exemplary sinusoidal periodic position error pattern shown in FIG. 2 and with respect to the correct timing mark position.

FIG. 3 depicts an exemplary correction pattern 300 with respect to tracks on a portion of the exemplary disk shown in FIG. 2 and with respect to the correct timing mark position. FIG. 4 depicts an exemplary correction pattern 300 with respect to the exemplary sinusoidal periodic position error pattern 200 shown in FIG. 2 and with respect to the correct timing mark position.

Figure 5:
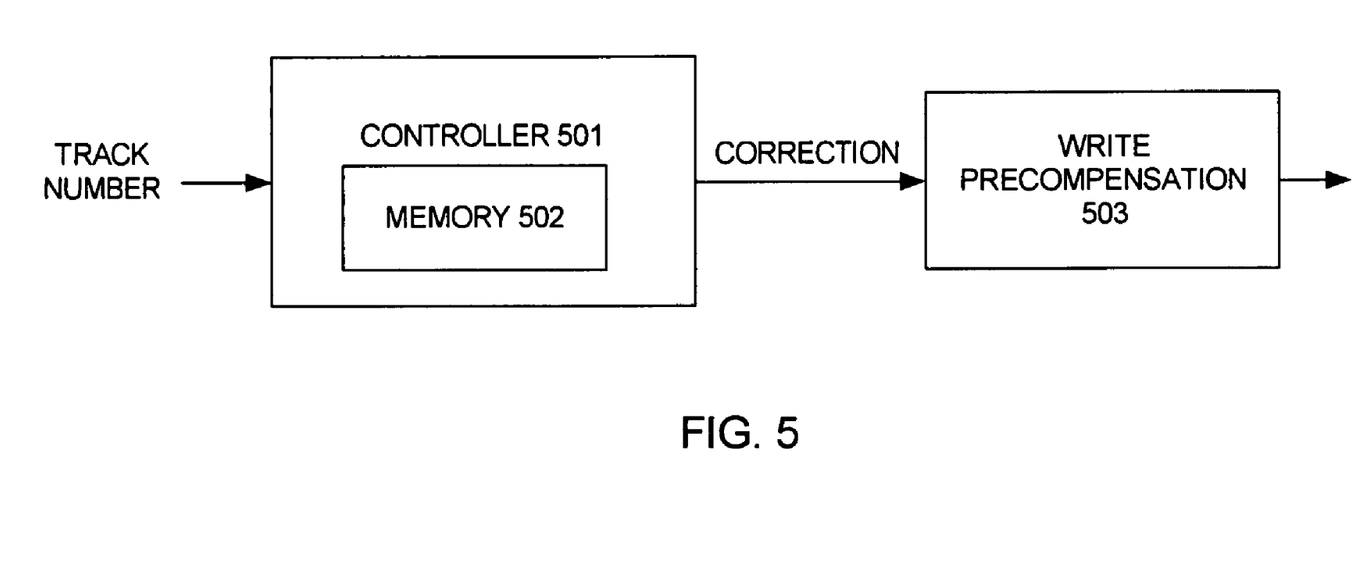
FIG. 5 depicts a functional block diagram of a disk controller 501 having a memory 502 containing an exemplary array, such as array Repsyserror[N] according to the present invention.

To illustrate removal of the periodic position error, consider an array Repsyserror[N] in which N is the integer part of, or closest integer to, the largest expected value of the offset, which corresponds to the read sensor/write element offset and the skew angle of the armature. FIG. 5 depicts a functional block diagram of a disk controller 501 having a memory 502 containing values corresponding to the periodic timing mark error for each radial track location. For example, consider an exemplary array Repsyserror[N] in which the variable Nc would be the current integer part of or closest integer to the current offset. An offset index (repindex) would be used that starts at zero and for each track step increments to Nc−1. When Nc−1 is reached, the next value of repindex would be zero. The looping of repindex from zero to Nc−1 continues through the warp propagation. The value of Repsyserror[repindex] is adjusted at each track step by a portion of the difference between the current value of the read sensor/write element offset and the current index-to-first-dibit measurement. In order to avoid interaction with the normal systematic delay loop, the average of all values of Repsyserror[i] is computed and subtracted from each value of Repsyserror[i] before being used to correct subsequent timing mark writes. The computation to generate the average could be done once for each Nc steps. A selected portion of Repsyserror[i] would be added to the systematic delay term at each step through write precompensator 503 (FIG. 5), thereby correcting any periodic position error of a warp that had been created during the self-servo write process.

To further illustrate the present invention, the following pseudo-code implements an exemplary embodiment of the present invention.

```
{
warpcorrect[warpindex]−=warpavg;
warpfix=warpcorrect[warpindex]*warpgain;
warpcorrect[warpindex]+=(warperr−warpcorrect[warpindex])*warpweight;
warpsum+=warpcorrect[warpindex];
if(++warpindex>=stepint)
    {
    warpavg=warpsum/stepint;
    warpsum=0.0;
    warpindex=0;
    }
}
oneshot = oneshot0+halfcorrect+warpfix;
```

The variable "stepint" would be the current integer portion of the read/write offset in servo steps. The variable "oneshot" is the systematic delay value. The variable "halfcorrect" is the normal systematic delay loop term. Lastly, the variable "warperr" is the current measurement of the index-to-first-dibit location relative to a target value. The equations illustrated by the above-psuedo-cod have been implemented and found to be effective in actual use. For one exemplary embodiment of the present invention, when stepint=2, warpweight=1.0, and warpgain=1.0. This would be a usable gain set for the case of very low measurement noise. For another, more typical, exemplary embodiment of the present invention, a typical set of gains might be warpweight=0.1, warpgain=0.02, but many other gain sets could be used for the present invention. Alternatively, an integral or other type of feedback structure would be utilized. When the variable "stepint" becomes larger as the skew angle of the armature changes resulting in a changing offset and changing value of Nc, the new active element(s) in the array should be assigned a value that is equal to the value of a neighboring element.

An alternative, more complicated approach could use a Fourier-type analysis of the systematic delay terms. Accordingly, the terms associated with the current offset that would be used for correcting for the periodic position errors at the offset frequencies would be determined by a Fourier-type analysis. An advantage of using a Fourier-type analysis is that noise can be reduced by choosing to correct only lower periodic frequencies, but the selected lower frequencies chosen to correct should be selected so that there is no substantial degradation in the quality of the correction. In a Fourier-type analysis, the estimated error measurement array warpcorrect would be converted to the frequency domain by standard Fourier techniques. Portions of the resulting frequency domain values (for example, the higher frequency ones) might then be reduced to zero. The resulting frequency domain representation would then be converted back to the original domain using Fourier techniques. This array would then be adjusted to zero mean and used as a replacement for the warpcorrect array values in computing the value of warpfix.

Although the foregoing invention has been described in some detail for purposes of clarity of understanding, it will be apparent that certain changes and modifications may be practiced that are within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for measuring a periodic component of a timing mark position error of a self-servo write pattern of a disk drive, the method comprising:
   measuring the timing mark position error of a first selected radial track location of a disk of the disk drive;
   measuring the timing mark position error of a second selected radial track location of the disk; and
   determining the periodic component of the timing mark position error of the self-servo write pattern based on the timing mark position error of the first selected radial track location and the timing mark position error of the second selected radial track location,
   wherein a distance between the first selected radial track location and the second selected radial track location is based on half of an offset between a read sensor and a write element of a read/write head of the disk drive.

2. The method according to claim 1, wherein a period of the periodic component of the timing mark position error is based on the offset between the read sensor and the write element of the read/write head.

3. The method according to claim 1, further comprising removing the periodic timing mark position error of the self-servo write pattern based on the determined periodic component of the timing mark position error of the self-servo write pattern.

4. The method according to claim 1, further comprising measuring the timing mark position error at a first plurality of selected radial track locations;
   measuring the timing mark position error at a second plurality of selected radial track locations; and
   determining the periodic component of the timing mark position error of the self-servo write pattern based on a difference between an average of the timing mark position error of the first plurality of selected radial track locations and an average of the timing mark position error of the second plurality of selected radial track locations.

5. The method according to claim 4, further comprising removing the periodic timing mark position error of the self-servo write pattern based on the determined periodic component of the timing mark position error of the self-servo write pattern.

6. The method according to claim 5, wherein removing the periodic timing mark position error includes
   generating a predicted error for each radial track position across the disk based on the determined periodic component of the timing mark position error of the self-servo write pattern; and
   write precompensating a write operation to a selected radial track position on the disk based on the generated predicted error.

7. A method for measuring a periodic component of a timing mark position error of a self-servo write pattern of a disk drive, the method comprising:
   measuring the timing mark position error of a first selected radial track location of a disk of the disk drive;
   measuring the timing mark position error of a second selected radial track location of the disk; and
   determining the periodic component of the timing mark position error of the self-servo write pattern based on the timing mark position error of the first selected radial track location and the timing mark position error of the second selected radial track location,
   wherein a distance between the first selected radial track location and the second selected radial track location is based on an offset between a read sensor and a write element of a read/write head of the disk drive, and
   wherein a maximum value of the periodic component of the timing mark position error is based on half of the offset between the read sensor and the write element of the read/write head.

8. A method for measuring a periodic component of a timing mark position error of a self-servo write pattern of a disk drive, the method comprising:
   measuring the timing mark position error of a first selected radial track location of a disk of the disk drive;
   measuring the timing mark position error of a second selected radial track location of the disk;
   determining the periodic component of the timing mark position error of the self-servo write pattern based on the timing mark position error of the first selected radial track location and the timing mark position error of the second selected radial track location; and
   removing the periodic timing mark position error of the self-servo write pattern based on the determined periodic component of the timing mark position error of the self-servo write pattern, wherein removing the periodic timing mark position error includes:
   generating a predicted error for each radial track position based on the determined periodic component of the timing mark position error of the self-servo write pattern; and adjusting a delay of a write operation to claim a selected radial track position between the first selected radial track location and the second selected radial track location based on the generated predicted error corresponding to the radial track position.

9. The method according to claim 8, wherein generating the predicted error generates a predicted error having a linear component.

10. The method according to claim 8, wherein generating the predicted error generates a predicted error based on a Fourier analysis of the determined the periodic component of the timing mark position error of the self-servo write pattern.

11. A method for measuring a periodic component of a timing mark position error of a self-servo write pattern of a disk drive, the method comprising:
   measuring the timing mark position error of a first selected radial track location of a disk of the disk drive;
   measuring the timing mark position error of a second selected radial track location of the disk;
   determining the periodic component of the timing mark position error of the self-servo write pattern based on the timing mark position error of the first selected radial track location and the timing mark position error of the second selected radial track location; and
   removing the periodic timing mark position error of the self-servo write pattern based on the determined periodic component of the timing mark position error of the self-servo write pattern, wherein removing the periodic timing mark position error includes
   generating a predicted error based on the determined periodic component of the timing mark position error of the self-servo write pattern; and
   write precompensating a write operation to a selected radial track position on the disk based on the generated predicted error.

12. A method for measuring a periodic component of a timing mark position error of a self-servo write pattern of a disk drive, the method comprising:
   measuring the timing mark position error of a first selected radial track location of a disk of the disk drive;
   measuring the timing mark position error of a second selected radial track location of the disk;
   determining the periodic component of the timing mark position error of the self-servo write pattern based on the timing mark position error of the first selected radial track location and the timing mark position error of the second selected radial track location;
   measuring the timing mark position error at a first plurality of selected radial track locations, each radial track location of the first plurality of selected radial track locations being related by an offset between a read sensor and a write element of a read/write head of the disk drive;
   measuring the timing mark position error at a second plurality of selected radial track locations, each radial track location of the second plurality of selected radial track locations being related by the offset between the read sensor and the write element of the read/write head of the disk drive; and
   determining the periodic component of the timing mark position error of the self-servo write pattern based on an average of the timing mark position error of the first plurality of selected radial track locations and an average of the timing mark position error of the second plurality of selected radial track locations.

13. The method according to claim 12, further comprising removing the periodic timing mark position error of the self-servo write pattern based on the determined periodic component of the timing mark position error of the self-servo write pattern.

14. The method according to claim 13, wherein removing the periodic timing mark position error includes
   generating a predicted error for each radial track position across the disk based on the determined periodic component of the timing mark position error of the self-servo write pattern; and
   write precompensating a write operation to a selected radial track position on the disk based on the generated predicted error.

15. The method according to claim 12, further comprising
   measuring the timing mark position error at at least one additional plurality of selected radial track location, each radial track location of each additional plurality of selected radial track locations being related by an offset between the read sensor and the write element of the read/write head of the disk drive; and
   determining the periodic component of the timing mark position error of the self-servo write pattern further based on an average of the timing mark position error of each additional plurality of selected radial track location.

16. A disk drive, comprising:
   at least one recording disk;
   an armature having a read/write head, the read/write head having a read sensor that is offset from a write element; and
   a controller removing a periodic component of a timing mark position error of a self-servo write pattern of a disk of the disk drive,
   wherein the controller removes the periodic timing mark position error based on a predicted error based on the determined periodic component of the timing mark position error of the self-servo write pattern and by write precompensating a write operation to a radial track position between a first selected radial track location and a second selected radial track location based on the generated predicted error corresponding to the radial track position.

17. The disk drive according to claim 16, wherein the controller removes the periodic component of the timing mark position error based on a measurement of a timing mark position error of a first selected radial track location of the disk drive and a measurement of a timing mark position error of a second selected radial track location of the disk drive.

18. The disk drive according to claim 17, wherein a distance between the first selected radial track location and the second selected radial track location is based on an offset between a read sensor and a write element of the read/write head of the disk drive.

19. The disk drive according to claim 17, wherein a period of the periodic component of the timing mark position error is based on the offset between the read sensor and the write element of the read/write head.

20. The disk drive according to claim 16, wherein the predicted error includes a linear component.

21. The disk drive according to claim 16, wherein the predicted error is based on a Fourier analysis of the periodic component of the timing mark position error of the self-servo write pattern.

22. The disk drive according to claim 16, wherein the controller removes the periodic component of the timing mark position error based on a difference between an average of the timing mark position error of the first plurality of selected radial track locations and an average of the timing mark position error of the second plurality of selected radial track locations.

23. The disk drive according to claim 16, wherein the controller removes the periodic component of the timing mark position error based on an average of the timing mark position error of a first plurality of selected radial track locations and an average of the timing mark position error of a second plurality of selected radial track locations.

24. The disk drive according to claim 23, wherein the controller removes the periodic component of the timing mark position error further based on an average of the timing mark position error of at least one additional plurality of selected radial track locations.

25. The disk drive according to claim 16, wherein the controller includes a memory storing a predicted periodic component of a timing mark position error that is used for removing the periodic component of the timing mark position error.

26. A disk drive, comprising:
 at least one recording disk;
 an armature having a read/write head, the read/write head having a read sensor that is offset from a write element; and
 a controller removing a periodic component of a timing mark position error of a self-servo write pattern of a disk of the disk drive,
 wherein the controller removes the periodic component of the timing mark position error based on a measurement of a timing mark position error of a first selected radial track location of the disk drive and a measurement of a timing mark position error of a second selected radial track location of the disk drive,
 wherein the distance between the first selected radial track location and the second selected radial track location is based on half of the offset between the read sensor and the write sensor of the read/write head.

27. A disk drive, comprising:
 at least one recording disk;
 an armature having a read/write head, the read/write head having a read sensor that is offset from a write element; and
 a controller removing a periodic component of a timing mark position error of a self-servo write pattern of a disk of the disk drive,
 wherein the controller removes the periodic component of the timing mark position error based on a measurement of a timing mark position error of a first selected radial track location of the disk drive and a measurement of a timing mark position error of a second selected radial track location of the disk drive,
 wherein a maximum value of the periodic component of the timing mark position error is based on half of the offset between the read sensor and the write element of the read/write head.

28. A disk drive, comprising:
 at least one recording disk;
 an armature having a read/write head, the read/write head having a read sensor that is offset from a write element; and
 a controller removing a periodic component of a timing mark position error of a self-servo write pattern of a disk of the disk drive,
 wherein the controller removes the periodic timing mark position error by generating a predicted error based on the determined periodic component of the timing mark position error of the self-servo write pattern and by write precompensating a write operation to a selected radial track position on the disk based on the generated predicted error.

\* \* \* \* \*